US011842029B2

(12) United States Patent
Zhang (10) Patent No.: US 11,842,029 B2
(45) Date of Patent: Dec. 12, 2023

(54) IMAGE DISPLAY METHOD AND MOBILE TERMINAL

(71) Applicant: VIVO MOBILE COMMUNICATION CO., LTD., Guangdong (CN)

(72) Inventor: Qian Zhang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/186,607

(22) Filed: Feb. 26, 2021

(65) Prior Publication Data

US 2021/0181921 A1    Jun. 17, 2021

Related U.S. Application Data

(63) Continuation of application No. PCT/CN2019/097459, filed on Jul. 24, 2019.

(30) Foreign Application Priority Data

Aug. 28, 2018   (CN) .......................... 201810990365.1

(51) Int. Cl.
   *G06F 3/048* (2013.01)
   *G06F 3/04815* (2022.01)
   *G06F 3/041* (2006.01)
   *G06F 3/04845* (2022.01)
   *G06F 3/04883* (2022.01)
   *G06F 3/14* (2006.01)

(52) U.S. Cl.
CPC ........ *G06F 3/04815* (2013.01); *G06F 3/0414* (2013.01); *G06F 3/04845* (2013.01); *G06F 3/04883* (2013.01); *G06F 3/1423* (2013.01)

(58) Field of Classification Search
CPC .... G06F 3/048; G06F 3/04845; G06F 3/0488; G06F 2203/04101; H04N 13/359; H04N 13/139; H04N 13/302
See application file for complete search history.

(56) References Cited

U.S. PATENT DOCUMENTS

| | | | |
|---|---|---|---|
| 6,271,854 B1 * | 8/2001 | Light | G06F 3/04815 |
| | | | 345/157 |
| 8,659,595 B2 * | 2/2014 | Chin | G06T 19/00 |
| | | | 345/419 |
| 9,503,710 B2 * | 11/2016 | Lee | H04N 13/398 |

(Continued)

FOREIGN PATENT DOCUMENTS

| CN | 102447923 A | 5/2012 |
|---|---|---|
| CN | 103092924 A | 5/2013 |

(Continued)

OTHER PUBLICATIONS

Kemmoku et al., AR Tablet Interface using a Head Mounted Projector; 2016; IEEE; 4 Pages.*

(Continued)

*Primary Examiner* — Linh K Pham
(74) *Attorney, Agent, or Firm* — Maschoff Brennan (57) ABSTRACT

An image display method is provided, the method is applied to a mobile terminal provided with a first screen and a second screen, and includes: receiving, in a case that the first screen displays a 2D image, a press operation on the 2D image; displaying a 3D image corresponding to the 2D image on the second screen.

12 Claims, 3 Drawing Sheets

(56) References Cited

U.S. PATENT DOCUMENTS

| | | | | |
|---|---|---|---|---|
| 2003/0197737 | A1* | 10/2003 | Kim | G06F 16/954 715/781 |
| 2006/0103664 | A1* | 5/2006 | Nakanishi | G06T 13/00 348/E13.044 |
| 2010/0271366 | A1* | 10/2010 | Sung | H04M 1/72439 345/419 |
| 2011/0018970 | A1* | 1/2011 | Wakabayashi | H04N 23/673 348/47 |
| 2011/0164029 | A1* | 7/2011 | King | G06T 19/00 345/173 |
| 2011/0320969 | A1* | 12/2011 | Hwang | G06F 3/0482 715/848 |
| 2012/0019528 | A1* | 1/2012 | Ugawa | H04N 13/128 345/419 |
| 2012/0038625 | A1* | 2/2012 | Kim | G06F 3/0488 345/419 |
| 2012/0069157 | A1* | 3/2012 | Nonaka | H04N 23/632 348/51 |
| 2012/0075294 | A1 | 3/2012 | Akifusa et al. | |
| 2012/0081361 | A1* | 4/2012 | Woo | H04N 21/816 345/419 |
| 2012/0133640 | A1* | 5/2012 | Chin | G06T 19/00 345/419 |
| 2012/0194509 | A1* | 8/2012 | Yun | H04N 13/361 345/419 |
| 2012/0249529 | A1* | 10/2012 | Matsumoto | H04N 13/398 345/419 |
| 2012/0249572 | A1* | 10/2012 | Yoshimura | H04N 21/4312 345/592 |
| 2012/0262398 | A1* | 10/2012 | Kim | G06F 3/04815 345/173 |
| 2012/0262450 | A1* | 10/2012 | Aiba | H04N 21/85406 345/419 |
| 2013/0016954 | A1* | 1/2013 | Watanabe | G11B 27/031 386/E5.028 |
| 2013/0050117 | A1* | 2/2013 | Cho | G06F 3/0488 345/173 |
| 2013/0124084 | A1* | 5/2013 | Seo | G01C 21/3638 701/436 |
| 2013/0141435 | A1* | 6/2013 | Cho | H04N 13/261 345/426 |
| 2013/0169632 | A1* | 7/2013 | Sawayama | G06T 11/003 345/419 |
| 2014/0022240 | A1* | 1/2014 | Lee | H04N 13/128 345/419 |
| 2014/0062999 | A1* | 3/2014 | Syu | H04N 13/161 345/419 |
| 2014/0085430 | A1* | 3/2014 | Komori | H04N 23/667 348/47 |
| 2014/0096092 | A1 | 4/2014 | Johnson | |
| 2014/0098188 | A1 | 4/2014 | Kwak et al. | |
| 2014/0129980 | A1 | 5/2014 | Lee | |
| 2014/0168389 | A1* | 6/2014 | Han | H04N 13/302 348/51 |
| 2014/0210955 | A1* | 7/2014 | Fujita | H04N 13/221 348/50 |
| 2014/0215406 | A1* | 7/2014 | Wu | G06F 3/042 715/848 |
| 2014/0300566 | A1* | 10/2014 | Lee | H04N 13/261 345/173 |
| 2014/0333531 | A1 | 11/2014 | Phang et al. | |
| 2015/0016587 | A1* | 1/2015 | Baek | G01N 23/046 378/10 |
| 2015/0042772 | A1* | 2/2015 | Mukhtarov | H04N 13/32 348/58 |
| 2015/0084878 | A1* | 3/2015 | Kim | G06F 3/04883 345/173 |
| 2015/0089411 | A1* | 3/2015 | Ban | A61B 8/467 715/765 |
| 2015/0161823 | A1* | 6/2015 | Anderson-Sprecher | G06T 15/005 345/419 |
| 2015/0189265 | A1* | 7/2015 | Maeda | H04N 13/359 348/43 |
| 2015/0241926 | A1 | 8/2015 | Park et al. | |
| 2015/0350626 | A1* | 12/2015 | Han | H04N 13/139 348/43 |
| 2016/0071328 | A1 | 3/2016 | Yao et al. | |
| 2017/0115793 | A1 | 4/2017 | Namgoong et al. | |
| 2017/0147180 | A1* | 5/2017 | Yoon | G01C 21/3638 |
| 2017/0193331 | A1* | 7/2017 | La Fleur | H04N 13/25 |
| 2018/0048885 | A1* | 2/2018 | Lee | H04N 1/00129 |
| 2018/0173333 | A1* | 6/2018 | Maruoka | G06T 11/001 |
| 2018/0288391 | A1* | 10/2018 | Lee | G06F 3/011 |
| 2018/0348946 | A1 | 12/2018 | Hao et al. | |
| 2019/0387094 | A1* | 12/2019 | Lee | H04M 1/725 |

FOREIGN PATENT DOCUMENTS

| | | | |
|---|---|---|---|
| CN | 103731602 | A | 4/2014 |
| CN | 103809904 | A | 5/2014 |
| CN | 104007915 | A | 8/2014 |
| CN | 105230030 | A | 1/2016 |
| CN | 105404485 | A | 3/2016 |
| CN | 105556429 | A | 5/2016 |
| CN | 105653099 | A | 6/2016 |
| CN | 106293390 | A | 1/2017 |
| CN | 106445339 | A | 2/2017 |
| CN | 106610748 | A | 5/2017 |
| CN | 107632749 | A | 1/2018 |
| CN | 107943407 | A | 4/2018 |
| CN | 104765905 | B | 8/2018 |
| CN | 108399027 | A | 8/2018 |
| CN | 108718351 | A * | 10/2018 |
| CN | 109144393 | A | 1/2019 |
| EP | 3 159 771 | A1 | 4/2017 |
| JP | 2012093820 | A | 5/2012 |
| JP | 2016058065 | A | 4/2016 |
| KR | 20170046410 | A | 5/2017 |
| KR | 20180058445 | A | 6/2018 |
| KR | 20180081298 | A | 7/2018 |
| WO | 2011/044936 | A1 | 4/2011 |
| WO | 2012056960 | A1 | 5/2012 |

OTHER PUBLICATIONS

Wang et al., Stereoscopic Thumbnail Creation via Efficient Stereo Saliency Detection; 2017; IEEE; 14 pages.*

Nguyen et al., 3DTouch: A Wearable 3D Input Device for 3D Applications; 2015; IEEE; 7 pages.*

EP Search Report in Application No. 19855229.1 dated Sep. 28, 2021.

KR Office Action in Application No. 10-2021-7008933 dated Jul. 26, 2022.

CN Office Action in Application No. 201810990365.1 dated Mar. 13, 2020.

CN Office Action in Application No. 201810990365.1 dated May 19, 2020.

CN Search Report in Application No. 201810990365.1 dated Mar. 16, 2020.

Written Opinion and International Search Report in Application No. PCT/CN2019/097459 dated Mar. 11, 2021.

EP Office Action dated Jul. 20, 2023 as received in Application No. 19855229.1.

* cited by examiner

IMAGE DISPLAY METHOD AND MOBILE TERMINAL

CROSS-REFERENCE TO RELATED APPLICATION

This application is a continuation application of PCT Application No. PCT/CN2019/097459 filed on Jul. 24, 2019, which claims a priority to the Chinese patent application No. 201810990365.1 filed in China on Aug. 28, 2018, disclosures of which are incorporated herein by reference in their entireties.

TECHNICAL FIELD

Embodiments of the present disclosure relate to the field of mobile terminal technologies, and in particular to an image display method and a mobile terminal.

BACKGROUND

As three dimensional (3D) technologies mature, the technologies are gradually applied to mobile terminals. Accordingly, 3D images may also be displayed in mobile terminals. However, since the 3D technologies haven't seen widespread application on mobile terminals thus far, even mobile terminals equipped with the 3D technology may not provide users with adequate usage experience.

Taking viewing 3D images as an example, conventionally, when viewing target 3D images on a mobile terminal, a user has to search for and finally determine the target 3D image to be viewed by opening 3D images one by one, which takes a long time and consumes a lot of power of the mobile terminal.

SUMMARY

In a first aspect, an image display method is provided in an embodiment of the present disclosure. The method is applied to a mobile terminal provided with a first screen and a second screen, and includes: receiving, in a case that the first screen displays a 2D image, a press operation on the 2D image; displaying a 3D image corresponding to the 2D image on the second screen.

In a second aspect, a mobile terminal is provided in an embodiment of the present disclosure. The mobile terminal includes a first screen and a second screen, and the mobile terminal further includes: a first reception module, configured to receive, in a case that the first screen displays a 2D image, a press operation on the 2D image; a display module, configured to display a 3D image corresponding to the 2D image on the second screen.

In a third aspect, a mobile terminal is provided in an embodiment of the present disclosure. The mobile terminal includes a processor, a memory and a program stored in the memory and executable by the processor, wherein the processor is configured to execute the program, to implement the steps of the image display method described in the embodiment of the present disclosure.

In a fourth aspect, a computer readable storage medium storing therein a program is provided in an embodiment of the present disclosure. The program is configured to be executed by a processor to implement the steps of the image display method described in the embodiment of the present disclosure.

The above description is only an overview of the technical solutions of the present disclosure. In order to facilitate a clearer understanding of technical means of the present disclosure so that they may be implemented in accordance with content of the specification, and to make the above and other objectives, features and advantages of the present disclosure more comprehensible, specific implementations of the present disclosure are given below.

BRIEF DESCRIPTION OF THE DRAWINGS

Various advantages and benefits will become apparent to those of ordinary skill in the art upon reading the detailed description of optional embodiments below. The drawings are only for illustrating optional embodiments and are not to be considered as limiting the present disclosure. Moreover, the same reference numerals are used throughout the drawings to refer to the same components. In the drawings.

DETAILED DESCRIPTION

The technical solutions of embodiments of the present disclosure will be clearly and completely described below with reference to the drawings of embodiments of the present disclosure. Apparently, the described embodiments are some embodiments of the present disclosure, but are not all the embodiments. Based on embodiments of the present disclosure, all other embodiments derived by a person of ordinary skill in the art without any creative efforts shall fall within the scope of the present disclosure.

Figure 1:
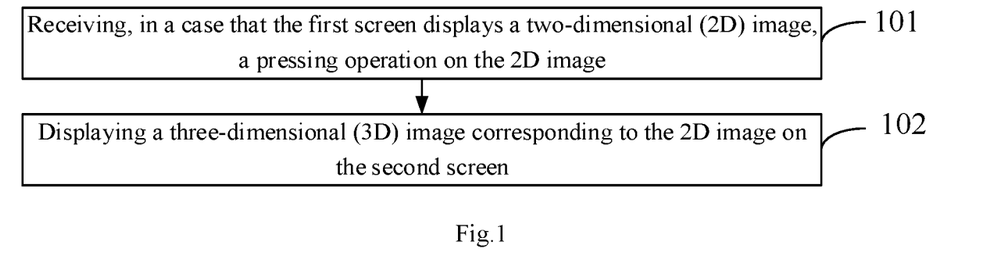
FIG. 1 is a flow chart of a first image display method according to an embodiment of the present disclosure.

Referring to FIG. 1, a flow chart of a first image display method according to an embodiment of the present disclosure is illustrated.

The image display method according to the embodiment of the present disclosure includes the following steps: Step 101 and Step 102.

Step 101: receiving, in a case that the first screen displays a two-dimensional (2D) image, a press operation on the 2D image.

The image display method provided in the embodiment of the present disclosure is applicable to a mobile terminal including two screens, a first screen and a second screen. The first screen and the second screen may be arranged oppositely, and the first screen may be a front screen or a back screen. Specifically, if the first screen is a front screen, the second screen is a back screen; if the first screen is a back screen, the second screen is a front screen. Apart from being arranged oppositely, the first screen and the second screen may also be arranged at a certain angle with respect to each other, such as 180°, 120°, or 90°. In addition, the first screen and the second screen may also be two sub-screens of a foldable display screen.

In a case that a 2D image is displayed on the first screen and a 3D image is not displayed on the second screen, a user may slide the 2D image left or right to trigger the first screen to switch the 2D image for display, and a user may locate an image to be viewed by searching for the 2D image. A user may perform a press operation on the 2D image to trigger the mobile terminal to display on the second screen a 3D image corresponding to the pressed 2D image.

The 2D image displayed on the first screen may be the 2D image itself or a 2D image thumbnail. In a case that the 2D image thumbnail is displayed on the first screen, only one 2D image thumbnail may be displayed, or multiple 2D image thumbnails may be displayed at the same time. In a case that multiple 2D image thumbnails are displayed, a user may select a target 2D image thumbnail to perform a press operation.

Step 102: displaying a 3D image corresponding to the 2D image on the second screen.

The mobile terminal determines the pressed 2D image according to the press operation performed by a user. A correspondence relationship between a 2D image and a 3D image is stored in the mobile terminal. After a pressed 2D image is determined, a 3D image corresponding to the pressed 2D image may be determined according to the stored correspondence relationship, and the 3D image is displayed on the second screen.

In the image display method provided in the embodiment of the present disclosure, in a case that the first screen displays a 2D image, the reception of a press operation on the 2D image may trigger the mobile terminal to display a 3D image corresponding to the 2D image on the second screen. In this way, a user may locate the target 3D image by viewing the 2D images displayed on the first screen one by one when searching for a 3D image. In the search process, the mobile terminal only needs to switch displayed 2D images, which may not only shorten display loading time but also reduce power consumption of the mobile terminal compared with switching displayed 3D images. Moreover, according to the image display method provided in the embodiment of the present disclosure, a 2D image and a corresponding 3D image may be displayed at the same time, which may improve user's visual experience.

Figure 2:
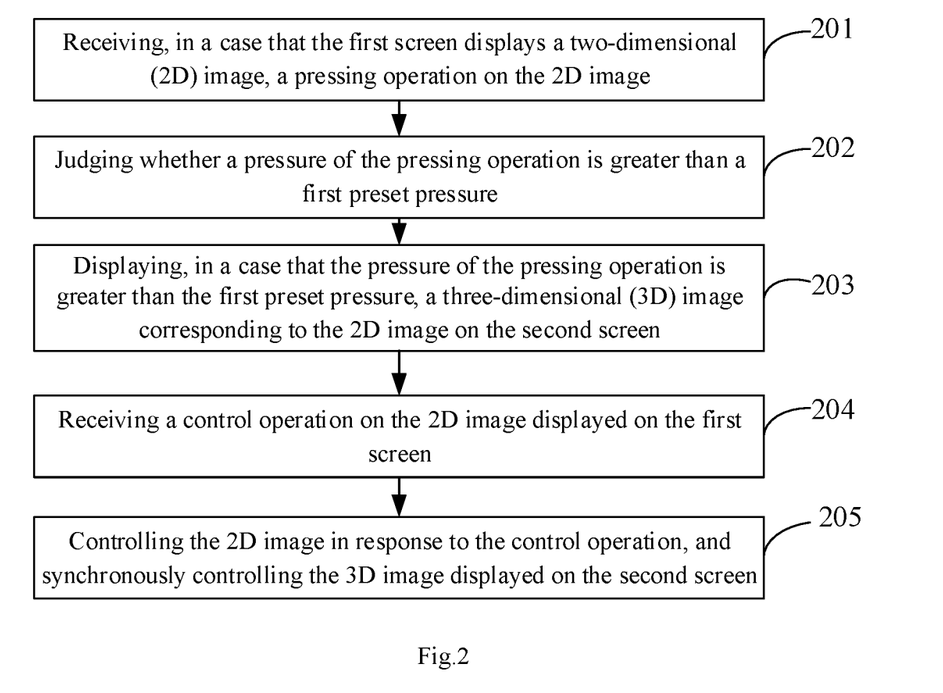
FIG. 2 is a flow chart of a second image display method according to an embodiment of the present disclosure.

Referring to FIG. 2, a flow chart of a second image display method according to an embodiment of the present disclosure is illustrated.

The image display method in the embodiment of the present disclosure includes the following steps: Step 201 to Step 205.

Step 201: receiving, in a case that the first screen displays a 2D image, a press operation on the 2D image.

The image display method provided in the embodiment of the present disclosure is applicable to a mobile terminal including two screens, a first screen and a second screen. A pressure detection module is arranged under the first screen. The pressure detection module may detect a pressure of the press operation performed by a finger on the first screen, and upload the detected pressure value to a processor of the mobile terminal.

Step 202: judging whether a pressure of the press operation is greater than a first preset pressure.

The first preset pressure may be configured by a person skilled in the art according to actual needs, which is not specifically limited in embodiments of the present disclosure.

In a case that the pressure of the press operation is greater than the first preset pressure, it is determined that this press operation is a valid operation, and the operation shown in Step 203 is performed; in a case that the pressure of the press operation is less than or equal to the first preset pressure, it is determined that this press operation is a false touch operation, and the detection of a user's press operation on the 2D image continues.

In the embodiment of the present disclosure, by means of judging whether a press operation is a false touch operation according to the pressure of the press operation, a user's false touch operation may be effectively identified, thereby avoiding mistakenly triggering the display of the 3D image on the second screen.

Step 203: displaying, in a case that the pressure of the press operation is greater than the first preset pressure, a 3D image corresponding to the 2D image on the second screen.

An image thumbnail is displayed on the first screen, and an image corresponding to the pressed image thumbnail is displayed on the second screen. A user may intuitively view the image and the image thumbnail at the same time, which may improve the user's visual experience.

Moreover, a user may also synchronously control a displayed image and an image thumbnail corresponding to the image. The specific synchronous control manner is as shown in Step 204 and Step 205.

Step 204: receiving a control operation on the 2D image displayed on the first screen.

The control operation may be a sliding operation, a rotation operation, a zoom-in operation, or a zoom-out operation performed on a 2D image. The sliding operation may be a slide up/down operation or a slide left/right operation.

Step 205: controlling the 2D image in response to the control operation, and synchronously controlling the 3D image displayed on the second screen.

The control of the 2D image may be any one of following control operations: moving the 2D image up or down, moving the 2D image left or right, rotating the 2D image, zooming in the 2D image, and zooming out the 2D image.

If the slide up/down operation is performed on the 2D image, the 2D image is moved up or down, and the 3D image displayed on the second screen is also moved up or down synchronously. If the slide up/down operation is performed on the 2D image, the 2D image is moved up or down, and the 3D image displayed on the second screen is also moved up or down synchronously. If the rotation operation is performed on the 2D image, the 2D image is rotated, and the 3D image displayed on the second screen is also rotated synchronously.

In a case that the control operation on the 2D image is a rotation operation, the mobile terminal determines a rotation angle and a rotation direction corresponding to the rotation operation, rotates the 2D image by the rotation angle according to the rotation direction, and synchronously rotates the 3D image displayed on the second screen by the rotation angle according to the rotation direction.

In a case that the control operation on the 2D image is a sliding operation, the mobile terminal receives the sliding operation performed by a user on the 2D image displayed on the first screen, and judges whether a pressure of the sliding operation on the first screen is greater than a second preset pressure; if the pressure of the sliding operation on the first screen is greater than the second preset pressure, the mobile terminal controls the 2D image in response to the sliding operation, and synchronously controls the 3D image displayed on the second screen.

A specific value of the second preset pressure may be configured by a person skilled in the art according to actual needs, which is not specifically limited in embodiments of the present disclosure. In this way, it is judged whether the pressure of the sliding operation on the first screen is greater than the second preset pressure. If yes, it is determined that the current sliding operation is a valid operation, otherwise, it is determined that the current sliding operation is a false touch operation. Thus, a problem of incorrect control of the 3D image caused by user's false sliding on the 2D image may be avoided.

In the image display method provided in the embodiment of the present disclosure, in a case that the first screen displays a 2D image, the reception of a press operation on the 2D image may trigger the mobile terminal to display a 3D image corresponding to the 2D image on the second screen. In this way, a user may locate the target 3D image by viewing the 2D images displayed on the first screen one by one when searching for a 3D image. In the search process, the mobile terminal only needs to switch displayed 2D images, which may not only shorten display loading time but also reduce power consumption of the mobile terminal compared with switching displayed 3D images. Moreover, according to the image display method provided in the embodiment of the present disclosure, a 2D image and a corresponding 3D image may be displayed at the same time, which may improve user's visual experience. A user may synchronously control the 2D image displayed on the first screen and the 3D image displayed on the second screen through a control operation, which may make it more fun for a user to operate.

Figure 3:
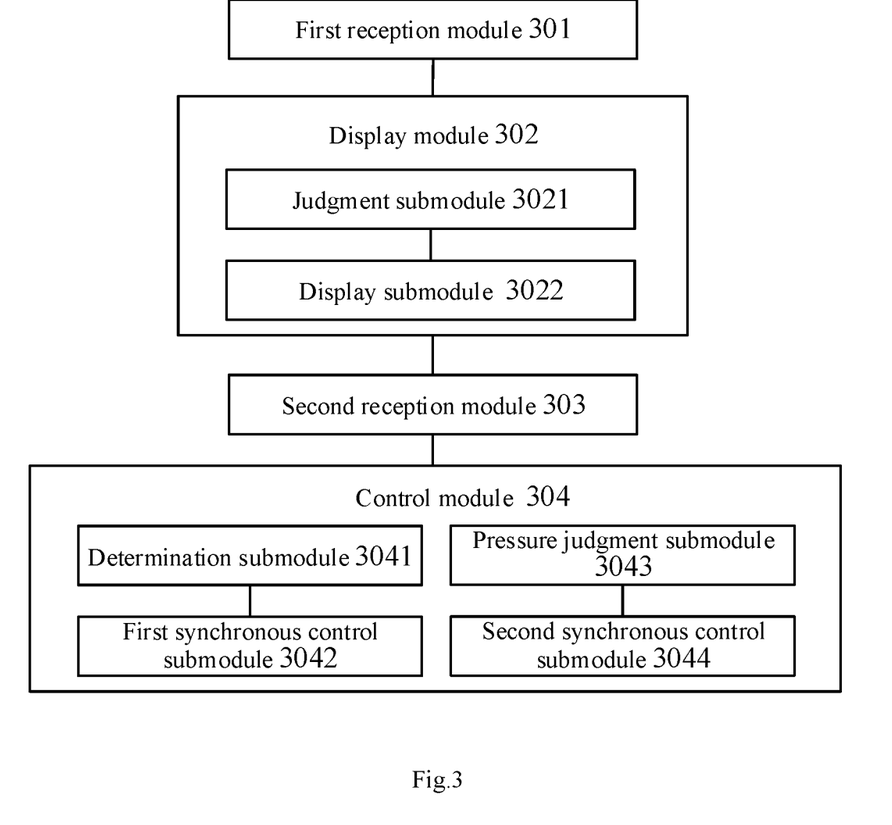
FIG. 3 is a structural diagram of a mobile terminal according to an embodiment of the present disclosure.

Referring to FIG. 3, a structural diagram of a mobile terminal according to an embodiment of the present disclosure is illustrated.

A mobile terminal according to the embodiment of the present disclosure includes a first screen and a second screen, and the mobile terminal also includes: a first reception module 301, configured to receive, in a case that the first screen displays a 2D image, a press operation on the 2D image; a display module 302, configured to display a 3D image corresponding to the 2D image on the second screen. The first screen and the second screen may be arranged oppositely, or may be arranged at a preset angle with respect to each other. Moreover, the first screen and the second screen may also be two sub-screens of a foldable screen.

Optionally, the display module 302 includes: a judgment submodule 3021, configured to judge whether a pressure of the press operation is greater than a first preset pressure; a display submodule 3022, configured to display, in a case that a judgment result of the judgment submodule is positive, the 3D image corresponding to the 2D image on the second screen.

Optionally, the mobile terminal further includes: a second reception module 303, configured to receive, after the display module 302 displays the 3D image corresponding to the 2D image on the second screen, a control operation on the 2D image displayed on the first screen; a control module 304, configured to control the 2D image in response to the control operation, and synchronously control the 3D image displayed on the second screen.

Optionally, the control module 304 includes: a determination submodule 3041, configured to determine, in a case that the control operation is a rotation operation, a rotation angle and a rotation direction corresponding to the rotation operation; a first synchronous control submodule 3042, configured to rotate the 2D image by the rotation angle according to the rotation direction, and synchronously rotate the 3D image displayed on the second screen by the rotation angle according to the rotation direction.

Optionally, the control module 304 includes: a pressure judgment submodule 3043, configured to judge, in a case that the control operation is a sliding operation, whether a pressure of the sliding operation on the first screen is greater than a second preset pressure; a second synchronous control submodule 3044, configured to control the 2D image in response to the sliding operation, and synchronously control the 3D image displayed on the second screen, in a case that a judgment result of the pressure judgment submodule is positive.

A mobile terminal provided in the embodiment of the present disclosure is able to implement various processes implemented by the mobile terminal in the method embodiments of FIG. 1 and FIG. 2, which will not be repeated herein to avoid repetition.

In the mobile terminal provided in the embodiment of the present disclosure, in a case that the first screen displays a 2D image, when a press operation on the 2D image is received, a 3D image corresponding to the 2D image is displayed on the second screen. In this way, a user may locate the target 3D image by viewing the 2D images displayed on the first screen one by one when searching for a 3D image. In the search process, the mobile terminal only needs to switch displayed 2D images, which may not only shorten display loading time but also reduce power consumption of the mobile terminal compared with switching displayed 3D images. Moreover, the mobile terminal provided in the embodiment of the present disclosure may display a 2D image and a corresponding 3D image at the same time, which may improve user's visual experience.

Figure 4:
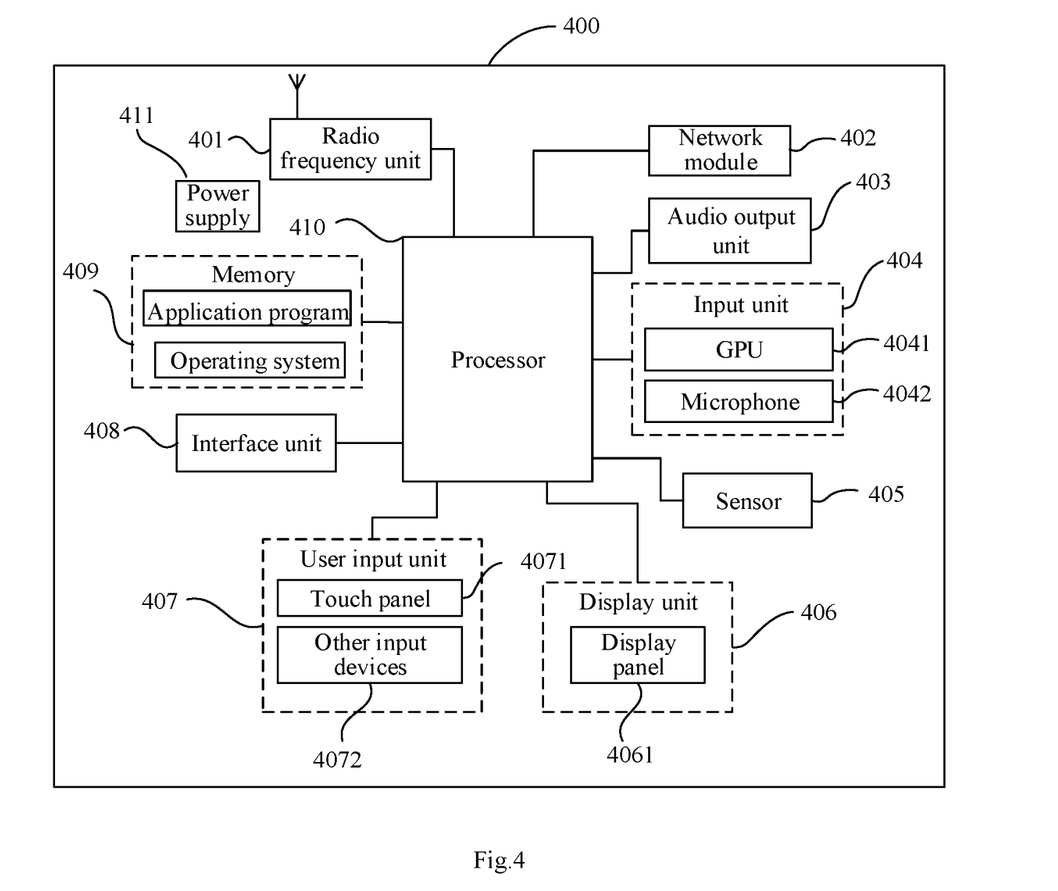
FIG. 4 is a schematic diagram of a hardware structure of a mobile terminal according to an embodiment of the present disclosure.

Referring to FIG. 4, a structural diagram of a mobile terminal according to an embodiment of the present disclosure is illustrated.

FIG. 4 is a schematic diagram of a hardware structure of a mobile terminal that implements various embodiments of the present disclosure. A mobile terminal 400 includes, but is not limited to, a radio frequency unit 401, a network module 402, and an audio output unit 403, an input unit 404, a sensor 405, a display unit 406, a user input unit 407, an interface unit 408, a memory 409, a processor 410, a power supply 411 and the like. Those skilled in the art may understand that the structure of the mobile terminal shown in FIG. 4 does not constitute a limitation on the mobile terminal, and the mobile terminal may include more or fewer components than those shown in the figure, or some components may be combined, or the components may have a different layout. In embodiments of the present disclosure, the mobile terminal includes, but is not limited to, a mobile phone, a tablet computer, a notebook computer, a palmtop computer, a car terminal, a wearable device, a pedometer, and the like.

The processor 410 is configured to: receive, in a case that the first screen displays a 2D image, a press operation on the 2D image; display a 3D image corresponding to the 2D image on the second screen.

In a mobile terminal provided in the embodiment of the present disclosure, in a case that the first screen displays a 2D image, when a press operation on the 2D image is received, a 3D image corresponding to the 2D image is displayed on the second screen. In this way, a user may locate the target 3D image by viewing the 2D images displayed on the first screen one by one when searching for a 3D image. In the search process, the mobile terminal only needs to switch displayed 2D images, which may not only shorten display loading time but also reduce power consumption of the mobile terminal compared with switching displayed 3D images. Moreover, the mobile terminal provided in the embodiment of the present disclosure may also display a 2D image and a corresponding 3D image at the same time, which may improve user's visual experience.

It should be understood that, in the embodiment of the present disclosure, the radio frequency unit 401 may be used to receive and send information or send and receive signals during a call. Specifically, the radio frequency unit 401 receives downlink data from a base station and forwards them to the processor 410 to be processed; and also sends uplink data to the base station. Generally, the radio frequency unit 401 includes, but is not limited to, an antenna, at least one amplifier, a transceiver, a coupler, a low-noise amplifier, a duplexer, and the like. In addition, the radio frequency unit 401 may also communicate with a network and other devices through a wireless communication system.

The mobile terminal provides users with wireless broadband Internet access through the network module 402, for example, helping users to send and receive emails, to browse web pages, and to access streamed media, etc.

The audio output unit 403 may convert audio data received by the radio frequency unit 401 or the network module 402 or stored in the memory 409 into audio signals and output them as sound. Moreover, the audio output unit 403 may also provide an audio output associated with a specific function performed by the mobile terminal 400 (for example, a call signal reception sound, a message reception sound, etc.). The audio output unit 403 includes a speaker, a buzzer, a telephone receiver, and the like.

The input unit 404 is used to receive audio signals or video signals. The input unit 404 may include a graphics processing unit (GPU) 4041 and a microphone 4042, and the graphics processing unit 4041 processes image data of a still picture or video obtained by an image capture device (such as a camera) in a video capture mode or an image capture mode. The processed image frames may be displayed by the display unit 406. The image frames processed by the graphics processing unit 4041 may be stored in the memory 409 (or other storage medium) or transmitted via the radio frequency unit 401 or the network module 402. The microphone 4042 may receive sound, and may process such sound into audio data. In a telephone call mode, the processed audio data may be converted and output in a format that may be transmitted to a mobile communication base station via the radio frequency unit 401.

The mobile terminal 400 further includes at least one sensor 405, such as a light sensor, a motion sensor, and other sensors. Specifically, the light sensor includes an ambient light sensor and a proximity sensor, wherein the ambient light sensor may adjust brightness of a display panel 4061 according to intensity of the ambient light, and the proximity sensor may turn off the display panel 4061 and/or backlight in a case that the mobile terminal 400 is moved close to an ear. As a type of the motion sensor, an accelerometer sensor may detect a magnitude of acceleration in various directions (usually three axes), and detect a magnitude and direction of gravity when being stationary, and may be used in posture identification of the mobile terminal (e.g., switch between portrait and landscape modes, related games, magnetometer posture calibration), vibration identification related function (e.g., pedometer, tap) and the like; the sensor 405 may also include a fingerprint sensor, a pressure sensor, an iris sensor, a molecular sensor, a gyroscope, a barometer, a hygrometer, a thermometer, an infrared sensor and the like, which is not described in detail herein.

The display unit 406 may be configured to display information inputted by the user or information provided to the user. The display unit 406 may include the display panel 4061, and the display panel 4061 may be configured in form of a liquid crystal display (LCD), an organic light-emitting diode (OLED) or the like.

The user input unit 407 may be used to receive inputted numeric information or character information and generate a key signal input related to user settings and function control of the mobile terminal. Specifically, the user input unit 407 includes a touch panel 4071 and other input devices 4072. The touch panel 4071, also referred to as a touch screen, may detect the user's touch operations thereon or nearby (such as operations performed on or in the vicinity of the touch panel 4071 by the user using a finger, stylus or any other suitable object or accessory). The touch panel 4071 may include two parts, namely a touch detection device and a touch controller. The touch detection device detects the position where the user touched and the signal resulting from the touch operation, and conveys the signal to the touch controller; the touch controller receives the touch information from the touch detection device, converts the information into coordinates of the touch and conveys the coordinates to the processor 410, as well as receives and executes the commands from the processor 410. Further, the touch panel 4071 may be implemented in a variety of modes, such as resistance, capacitance, infrared and surface acoustic wave. In addition to the touch panel 4071, the user input unit 407 may include other input devices 4072. In specific, the other input devices 4072 may include, but is not limited to: physical keyboard, functional keys (such as volume button, switch button, etc.), track ball, mouse, joystick, which is not described in detail herein.

Further, the touch panel 4071 may cover the display panel 4061, in a case that the touch panel 4071 detects a touch operation thereon or nearby, the touch operation is transmitted to the processor 410 to determine the type of the touch event, then the processor 410 provides a corresponding visual output on the display panel 4061 based on the type of the touch event. Although in FIG. 4, the touch panel 4071 and the display panel 4061 are implemented as two independent components to implement input and output functions of the mobile terminal, in some embodiments, the touch panel 4071 and the display panel 4061 may be integrated to implement the input and output functions of the mobile terminal, which are not limited herein.

The interface unit 408 is an interface through which an external device is connected to the mobile terminal 400. For example, the external device may include a wired or wireless headset port, an external power supply (or battery charger) port, a wired or wireless data port, a storage card port, a port for connecting a device with an identification module, and an audio input/output (I/O) port, a video I/O port, or a headphone port, etc. The interface unit 408 may be used to receive input (e.g., data information, power, etc.) from the external device and transmit the received input to one or more elements within the mobile terminal 400 or may be used to transmit data between the mobile terminal 400 and the external device.

The memory 409 may be used to store software programs and various data. The memory 409 may mainly include a program storage area and a data storage area, wherein the program storage area may store an operating system, an application program (such as a sound playback function, an image playback function, etc.) required for at least one function, and the like; the data storage area may store data (such as audio data, a phone book, etc.) created based on the use of a mobile phone and the like. In addition, the memory 409 may include a high-speed random access storage, and may further include a non-volatile storage, such as at least one magnetic disk storage device, a flash memory device, or other volatile solid-state storage device.

The processor 410 is a control center of the mobile terminal, and uses various interfaces and lines to connect various parts of the entire mobile terminal. By running or executing software programs and/or modules stored in the memory 409 and calling data stored in the memory 409, the processor 410 carries out various functions of the mobile terminal and processes data, so as to achieve an overall monitoring of the mobile terminal. The processor 410 may include one or more processing units; optionally, the processor 410 may integrate an application processor and a modem processor, wherein the application processor mainly processes an operating system, a user interface, and an application program, etc. The modem processor mainly handles wireless communication. It could be understood that the modem processor may not be integrated into the processor 410.

The mobile terminal 400 may further include a power supply 411 (such as a battery) for supplying power to various components. Optionally, the power supply 411 may be logically connected to the processor 410 through a power management system, so as to implement functions such as management of charging, management of discharging, and power consumption management through the power management system.

In addition, the mobile terminal 400 includes some functional modules that are not shown, and details thereof are not described herein.

Optionally, an embodiment of the present disclosure further provides a mobile terminal, and the mobile terminal includes: a processor 410, a memory 409, and a program stored in the memory 409 and executable by the processor 410, the processor 410 is configured to execute the program to implement various processes in embodiments of the image display method, and the same technical effect may be achieved, which will not be described in detail again to avoid repetition.

An embodiment of the present disclosure also provides a computer readable storage medium storing therein a program, and the program is configured to be executed by a processor to implement various processes in embodiments of the image display method, and the same technical effect may be achieved, which will not be described in detail again to avoid repetition. The computer readable storage medium may be, for example, a read-only memory (ROM), a random access memory (RAM), a magnetic disk or an optical disc, etc.

It should be noted that, in this article, the terms "including" or "having" or any other variations thereof are intended to encompass a non-exclusive inclusion, such that a process, a method, an article, or a device that includes a plurality of elements includes not only those elements but also other elements not explicitly listed, or elements that are inherent to such a process, a method, an article, or a device. In a case that there is no further limitation, an element after a phrase "including a . . . " does not exclude presence of additional identical elements in the process, the method, the article, or the device that includes the element.

From the foregoing description of the embodiments, a person skilled in the art will clearly appreciate that the method according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The computer software product is stored in a storage medium (e.g., an ROM/RAM, a magnetic disk and an optical disc) and includes several instructions configured to be executed by a terminal (such as a handset, a computer, a server, an air conditioner or a network device) to perform the method according to the embodiments of the present disclosure.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the gist of the present disclosure and the scope of the claims, and these forms all fall within the scope of the present disclosure.

What is claimed is:

1. An image display method, applied to a mobile terminal provided with a first display screen and a second display screen different from the first display screen, comprising:
receiving, in a case that the first display screen displays a two-dimensional (2D) image, a press operation on the 2D image;
displaying a three-dimensional (3D) image corresponding to the 2D image on the second display screen in response to the press operation;
wherein the 2D image and the 3D image are displayed simultaneously;
wherein subsequent to displaying the 3D image corresponding to the 2D image on the second display screen, the method further comprises:
receiving a control operation on the 2D image displayed on the first display screen, wherein the control operation comprises a sliding operation, a rotation operation, a zoom-in operation, or a zoom-out operation;
controlling the 2D image in response to the control operation, and synchronously controlling the 3D image displayed on the second display screen.

2. The image display method according to claim 1, wherein the displaying the 3D image corresponding to the 2D image on the second display screen comprises:
judging whether a pressure of the press operation is greater than a first preset pressure;
displaying, in a case that the pressure of the press operation is greater than the first preset pressure, the 3D image corresponding to the 2D image on the second display screen.

3. The image display method according to claim 1, wherein, in a case the control operation is the rotation operation, the controlling the 2D image in response to the control operation, and synchronously controlling the 3D image displayed on the second display screen comprises:
determining a rotation angle and a rotation direction corresponding to the rotation operation;
rotating the 2D image by the rotation angle according to the rotation direction, and synchronously rotating the 3D image displayed on the second display screen by the rotation angle according to the rotation direction.

4. The image display method according to claim 1, wherein, in a case the control operation is the sliding operation, the controlling the 2D image in response to the control operation, and synchronously controlling the 3D image displayed on the second display screen comprises:
judging whether a pressure of the sliding operation on the first display screen is greater than a second preset pressure;
controlling the 2D image in response to the sliding operation, and synchronously controlling the 3D image displayed on the second display screen, in a case that the pressure of the sliding operation on the first display screen is greater than the second preset pressure.

5. A mobile terminal, comprising a processor, a memory and a program stored in the memory and executable by the processor, and further comprising a first display screen and a second display screen different from the first display screen, wherein the processor is configured to execute the program, to implement an image display method, and the image display method comprises:

receiving, in a case that the first display screen displays a two-dimensional (2D) image, a press operation on the 2D image;

displaying a three-dimensional (3D) image corresponding to the 2D image on the second display screen in response to the press operation;

wherein the 2D image and the 3D image are displayed simultaneously;

wherein subsequent to displaying the 3D image corresponding to the 2D image on the second display screen, the method further comprises:

receiving a control operation on the 2D image displayed on the first display screen, wherein the control operation comprises a sliding operation, a rotation operation, a zoom-in operation, or a zoom-out operation;

controlling the 2D image in response to the control operation, and synchronously controlling the 3D image displayed on the second display screen.

6. The mobile terminal according to claim 5, wherein the displaying the 3D image corresponding to the 2D image on the second display screen comprises:

judging whether a pressure of the press operation is greater than a first preset pressure;

displaying, in a case that the pressure of the press operation is greater than the first preset pressure, the 3D image corresponding to the 2D image on the second display screen.

7. The mobile terminal according to claim 5, wherein, in a case the control operation is the rotation operation, the controlling the 2D image in response to the control operation, and synchronously controlling the 3D image displayed on the second display screen comprises:

determining a rotation angle and a rotation direction corresponding to the rotation operation;

rotating the 2D image by the rotation angle according to the rotation direction, and synchronously rotating the 3D image displayed on the second display screen by the rotation angle according to the rotation direction.

8. The mobile terminal according to claim 5, wherein, in a case the control operation is the sliding operation, the controlling the 2D image in response to the control operation, and synchronously controlling the 3D image displayed on the second display screen comprises:

judging whether a pressure of the sliding operation on the first display screen is greater than a second preset pressure;

controlling the 2D image in response to the sliding operation, and synchronously controlling the 3D image displayed on the second display screen, in a case that the pressure of the sliding operation on the first display screen is greater than the second preset pressure.

9. A non-transitory computer readable storage medium storing therein a program, wherein the program is configured to be executed by a processor to implement an image display method applied to a mobile terminal provided with a first display screen and a second display screen different from the first display screen, and the image display method comprises:

receiving, in a case that the first display screen displays a two-dimensional (2D) image, a press operation on the 2D image;

displaying a three-dimensional (3D) image corresponding to the 2D image on the second display screen in response to the press operation;

wherein the 2D image and the 3D image are displayed simultaneously;

wherein subsequent to displaying the 3D image corresponding to the 2D image on the second display screen, the method further comprises:

receiving a control operation on the 2D image displayed on the first display screen, wherein the control operation comprises a sliding operation, a rotation operation, a zoom-in operation, or a zoom-out operation;

controlling the 2D image in response to the control operation, and synchronously controlling the 3D image displayed on the second display screen.

10. The non-transitory computer readable storage medium according to claim 9, wherein the displaying the 3D image corresponding to the 2D image on the second display screen comprises:

judging whether a pressure of the press operation is greater than a first preset pressure;

displaying, in a case that the pressure of the press operation is greater than the first preset pressure, the 3D image corresponding to the 2D image on the second display screen.

11. The non-transitory computer readable storage medium according to claim 9, wherein, in a case the control operation is the rotation operation, the controlling the 2D image in response to the control operation, and synchronously controlling the 3D image displayed on the second display screen comprises:

determining a rotation angle and a rotation direction corresponding to the rotation operation;

rotating the 2D image by the rotation angle according to the rotation direction, and synchronously rotating the 3D image displayed on the second display screen by the rotation angle according to the rotation direction.

12. The non-transitory computer readable storage medium according to claim 9, wherein, in a case the control operation is the sliding operation, the controlling the 2D image in response to the control operation, and synchronously controlling the 3D image displayed on the second display screen comprises:

judging whether a pressure of the sliding operation on the first display screen is greater than a second preset pressure;

controlling the 2D image in response to the sliding operation, and synchronously controlling the 3D image displayed on the second display screen, in a case that the pressure of the sliding operation on the first display screen is greater than the second preset pressure.

\* \* \* \* \*